June 2, 1959  C. S. BRAY  2,888,714
PROCESS FOR THE ROTATIONAL CASTING OF INFLATING BULBS
Filed Aug. 3, 1955  2 Sheets-Sheet 1

INVENTOR.
Calvin S. Bray
BY Nathaniel Frucht
Atty

June 2, 1959 C. S. BRAY 2,888,714
PROCESS FOR THE ROTATIONAL CASTING OF INFLATING BULBS
Filed Aug. 3, 1955 2 Sheets-Sheet 2

INVENTOR.
Calvin S. Bray
BY
Nathaniel Frucht
Atty

United States Patent Office 2,888,714
Patented June 2, 1959

2,888,714

PROCESS FOR THE ROTATIONAL CASTING OF INFLATING BULBS

Calvin S. Bray, Lincoln, R.I., assignor to Davol Rubber Company, a corporation of Rhode Island Application August 3, 1955, Serial No. 526,228

1 Claim. (Cl. 18—58.3)

The present invention relates to the manufacture of rubber articles, and has particular reference to the manufacture of inflating bulbs, such as syringe, aspirator, and evacuation bulbs.

The present manufacture includes molding the bulb with a solid neck plug and then drilling the neck plug through to provide a passage communicating with the hollow interior, the passage being adapted to receive a tubing section, a pipe, an irrigation fitting, or the like.

The principal object of the invention is to mold an inflating bulb complete with neck passage in one operation.

Another object of the invention is to provide an inflating bulb in one molding operation, which requires no passage drilling, and which has a completely smooth outer surface.

A further object of the invention is to utilize a molding procedure which forms a neck passage with a frangible closure attached to the inner portion of the passage walls, whereby shreds formed in breaking the closure away are concealed from view.

With the above and other objects and advantageous features which will become apparent as the description proceeds, the invention consists of a novel method of manufacture, more fully disclosed in the detailed description thereof, in conjunction with the accompanying drawings, and more specifically defined in the claim appended hereto.

It has been found advisable to produce an inflation bulb complete with a flow passage or with flow passages by a simple molding process, whereby cost of manufacture is greatly reduced and spoilage due to irregular passage drilling is eliminated. To this end, I mold a bulb in a sectional mold which has a novel passage pin in one section if the bulb is a single neck bulb, and has a second passage pin in the other section if a double neck bulb is desired.

Figure 1:
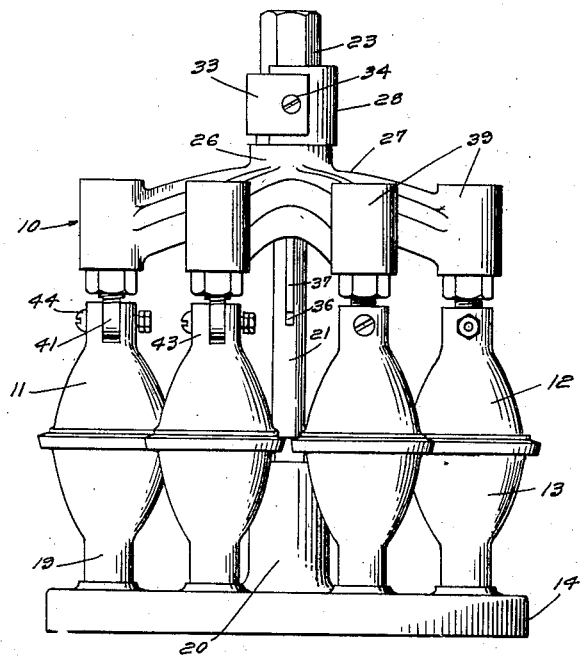
Fig. 1 is a front elevation of a preferred gang mold.

Referring to the drawings, the preferred mold is of the gang type disclosed by the reference numeral 10 in Fig. 1, and includes a number of annularly disposed individual molds 11, each comprising an upper mold section 12 and a lower mold section 13. The lower mold sections are each secured to a circular plate 14, see Fig. 5, as by screws 15 which are seated in recesses 16 and bores 17 and engage the walls of a threaded recess 18 in the foot 19 of each lower mold section.

Figure 3:
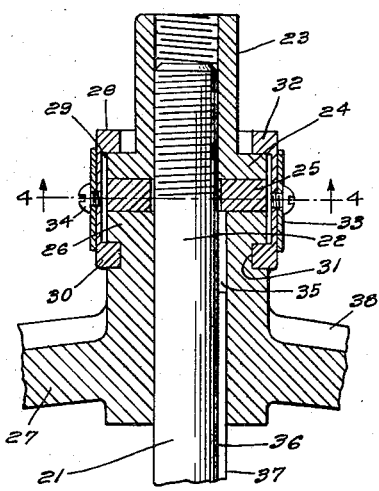
Fig. 3 is an enlarged sectional detail on the line 3—3 of Fig. 2.
Figure 4:
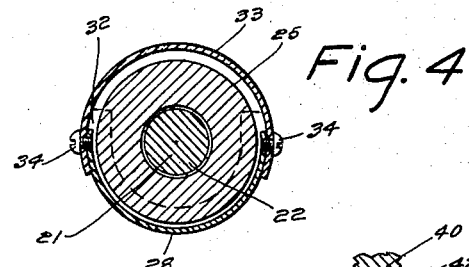
Fig. 4 is a section on the line 4—4 of Fig. 3.

A central socket hub 20 extending upwardly from the plate 14 has a central shaft 21 mounted therein, the upper end 22 of the shaft being threaded to receive a hexagonal nut 23. The lower end of the nut has an annular flange 24 which seats on a ring 25, the ring 25 being seated on the tubular central hub 26 of an upper mold support 27. A U-shaped holding element 28 with an arcuate channel 29 has one channel wall 30 seated in an annular groove 31 in the flange 26, the other channel wall 32 extending over the nut flange 24, whereby an arcuate lock plate 33 locked to the holding element by screws 34 locks the nut 23 and the upper mold support in assembled relation. The bore of the hub 26 has a key way 35 and the shaft 21 has a keyway 36, whereby a spline 37, see Fig. 3, locks the upper mold support 27 against rotation on the central shaft while permitting up and down movement of the upper mold support when the nut 23 is manually turned.

Figure 2:
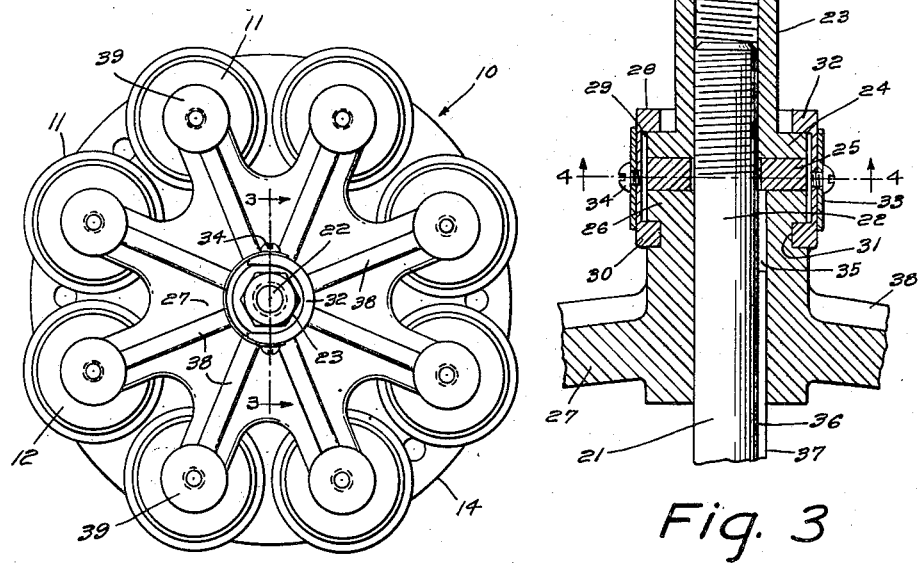
Fig. 2 is a top plan view thereof.

The upper mold support 27 includes a plurality of radial arms 38, see Fig. 2, each arm having a terminal hub 39 threaded to receive the upper threaded cylindrical portion 40 of a rectangular stud 41 having a through bore 42. The upper mold sections 12 each have a U-shaped saddle 43 in which one stud 41 is received, the saddle sides being bored to receive a lock screw 44, whereby the upper mold sections are each swingingly mounted on their associated studs 41.

Figure 5:
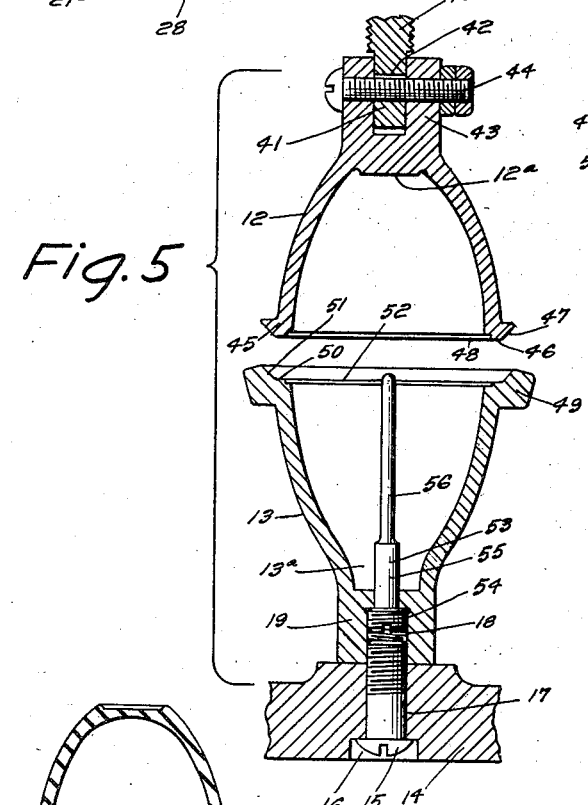
Fig. 5 is a vertical sectional detail of one bulb mold, the sectional parts being separated.

As illustrated in Fig. 5, each upper mold section 12 is generally egg-cup shaped with a generally flat base 12a and an annular lower rim 45 which is flat at the bottom as indicated at 46, is outwardly upwardly inclined as indicated at 47, and is inwardly recessed as indicated at 48. The flat base portion may be modified, as described subsequently, for making double neck bulbs. Each lower mold section 13 is cooperatively shaped, with a neck 13a, and a cooperating annular upper rim 49 which has a flat section 50, an upwardly inclined portion as indicated at 51, and an inwardly recessed portion as indicated at 52.

The mold parts indicated in Fig. 5 are for the molding of a single neck bulb, and are preferably of aluminum. The lower section 13 is provided with an upstanding pin element 53, of aluminum or steel, which has a threaded head 54 seated in the recess 18, a cylindrical shoulder portion 55 which extends into the lower mold section 13, and an upstanding pin 56.

With the mold parts spaced apart as shown in Fig. 5, the upper mold sections are turned or swung to permit pouring a measured volume of a moldable liquid into each lower mold section. A suitable material is polyvinyl chloride, although any other material in liquid form which can be cured into a flexible hollow form, such as latex in solution, may be used if desired.

The upper mold sections are now placed over the lower mold sections, and the nut 23 is turned to lock the upper and lower mold sections together. The mold is then placed in a curing oven, preferably of the rotating platform type, locked to the platform and subjected to curing heat, about 600° F. for polyvinyl chloride, for about six minutes, the platform being turned about eighteen times each minute.

Figure 6:
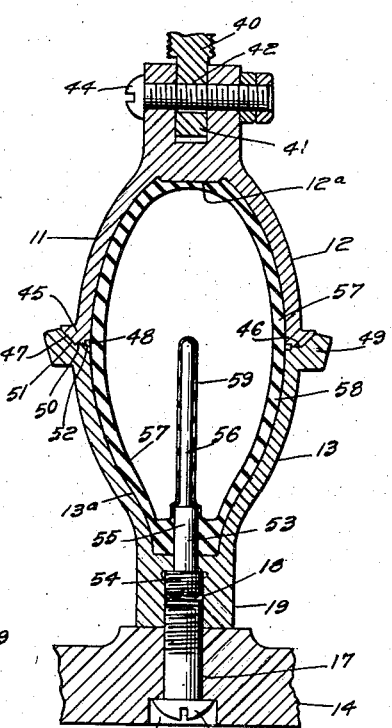
Fig. 6 is a view similar to Fig. 5, the parts being in molding position, and a molded bulb being seated therein.
Figure 9:
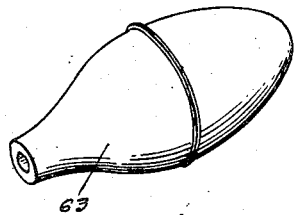
Fig. 9 is a perspective view of the bulb of Fig. 8.
Figure 7:
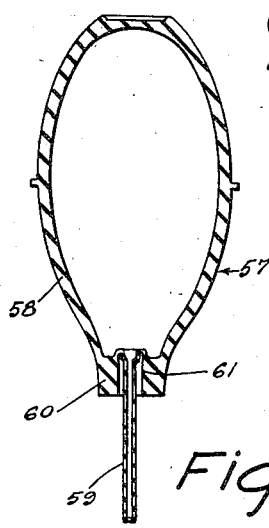
Fig. 7 is a central sectional view of one bulb blank as removed from the mold.
Figure 8:
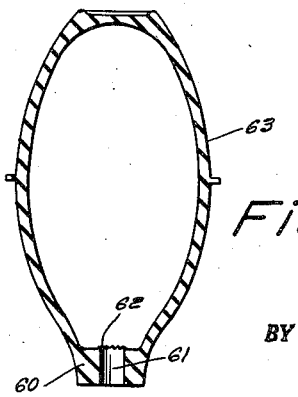
Fig. 8 is a view similar to Fig. 7, the closure being broken off.

The mold is then removed, cooled, and opened. The molded bulb is as indicated at 57 in Fig. 6, with an egg-type shell 58 and a central inwardly extending pin coating 59, which is turned inside out as indicated in Fig. 7 when the bulb is withdrawn from the mold. It will be noted that the bulb has a neck portion 60 with a smooth passage or bore 61, whereby tearing the coating 59 produces shreds 62 on the inside of the passage 61, where they cannot be seen and do not interfere with the insertion and mounting of a flow plug. The resulting bulb 63 is therefore completed, ready for use, in a single molding operation.

It will be noted that cylindrical shoulder portion 55 is of constant diameter and that the diameter of pin 56 is substantially reduced from that of said shoulder portion. This insures that the passage or bore 61 will be sufficiently large for the pin 56 and its coating 59 to invert therethrough as the bulb is being withdrawn from the mold. If, for example, cylindrical shoulder portion 55 or any part thereof were smaller or even equal in diameter to that of pin 56, then it would be likely that coating 59 would be stripped from said pin as the latter passes outwardly through said reduced bore portion whereby the coating would remain inside the completed bulb, thus defeating the basic concept of the instant invention.

When double neck type bulbs are required, the upper mold sections 12 are correspondingly shaped, and are provided with pin elements 53.

Although I have disclosed one bulb construction embodying the invention, it is obvious that changes in the size and shape of the parts and in the material used and the molding procedure followed may be made to produce different sizes and shapes of bulbs, without departing from the spirit or the scope of the invention as defined in the appended claim.

I claim:

The method of molding a bulb having a neck portion with a passage therethrough, comprising the steps of pouring a measured volume of curable material in liquid form into a mold having cooperating separable sections, one of said sections having an inwardly extending cylindrical shoulder portion from which inwardly extends a pin having a diameter smaller at any point than that of any portion of said cylindrical shoulder, subjecting the mold to curing heat while rotating the mold to disperse the bulb material over the entire inner mold surface including the inwardly extending shoulder and pin, separating the mold sections, removing the cured bulb from said one section in such manner that the pin is pulled outwardly through the bulb passage and the pin coating is inverted and projects outwardly from the bulb, and breaking said coating away at its connection to the bulb.

References Cited in the file of this patent

UNITED STATES PATENTS

| | | |
|---|---|---|
| 2,477,899 | Rempel | Aug. 2, 1949 |
| 2,569,869 | Rempel | Oct. 2, 1951 |
| 2,629,134 | Molitor | Feb. 24, 1953 |
| 2,730,765 | Crafton et al. | Jan. 17, 1956 |
| 2,818,604 | Miller et al. | Jan. 7, 1958 |
| 2,830,325 | Bray | Apr. 15, 1958 |